(12) United States Patent
Lee et al.

(10) Patent No.: US 8,786,539 B2
(45) Date of Patent: Jul. 22, 2014

(54) STEREO-IMAGE DISPLAYING APPARATUS AND METHOD FOR REDUCING STEREO-IMAGE CROSS-TALK

(75) Inventors: Kuen Lee, Hsinchu (TW); Kuo-Chung Huang, Taipei County (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1781 days.

(21) Appl. No.: 11/672,521

(22) Filed: Feb. 8, 2007

(65) Prior Publication Data

US 2008/0042924 A1    Feb. 21, 2008

(30) Foreign Application Priority Data

Aug. 16, 2006    (TW) ................................ 95130046 A

(51) Int. Cl.
*G09G 3/36*    (2006.01)
(52) U.S. Cl.
USPC .......................................................... 345/102
(58) Field of Classification Search
None
See application file for complete search history.

(56) References Cited

U.S. PATENT DOCUMENTS

| | | | |
|---|---|---|---|
| 6,215,590 B1 | 4/2001 | Okano | |
| 6,232,937 B1 * | 5/2001 | Jacobsen et al. | 345/87 |
| 6,816,142 B2 * | 11/2004 | Oda et al. | 345/89 |
| 7,190,518 B1 * | 3/2007 | Kleinberger et al. | 359/465 |
| 2009/0040426 A1 * | 2/2009 | Mather et al. | 349/65 |

FOREIGN PATENT DOCUMENTS

| | | |
|---|---|---|
| CN | 1247362 | 3/2000 |
| WO | 2005071474 | 8/2005 |

OTHER PUBLICATIONS

"1st Office Action of China counterpart application", issued on May 22, 2009, p. 1-p. 5.
"Office Action of Taiwan Counterpart Application", issued on May 5, 2010. p. 1-p. 5.

* cited by examiner

*Primary Examiner* — Joe H Cheng
*Assistant Examiner* — Keith Crawley
(74) *Attorney, Agent, or Firm* — Jianq Chyun IP Office

(57) ABSTRACT

A stereo-image displaying apparatus includes a light-source module and an image displaying device. The light-source module has at least one light-emitting block. A light-source driving unit is coupled with the light-source module and the image displaying device. The light-emitting block is driven by the light-source driving unit to synchronously emit a light according to a displaying frequency of the image displaying device with a reduced light-emitting duty cycle. The cross-talk between stereo images is reduced by using the light emitted from the light-source module, synchronously associating with the image displaying device.

20 Claims, 5 Drawing Sheets

STEREO-IMAGE DISPLAYING APPARATUS AND METHOD FOR REDUCING STEREO-IMAGE CROSS-TALK

CROSS-REFERENCE TO RELATED APPLICATION

This application claims the priority benefit of Taiwan application serial no. 95130046, filed on Aug. 16, 2006. All disclosure of the Taiwan application is incorporated herein by reference.

BACKGROUND OF THE INVENTION

1. Field of the Invention

The present invention relates to a stereo-image displaying technology, particularly, it relates to a stereo-image apparatus and method of reducing stereo-image cross-talk.

2. Description of Related Art

The stereo-image displaying method has entered the commercialized stage with display devices being rapidly developed. Development of the stereo-image displaying apparatus will become the main stream in terms of manufacturing the next generation of displaying device; and this has gained the consensus among the industries. The need for the naked-eye stereo-image displaying technology is increasing among the industries of medication, exhibition, entertainment, education, military and advertisement, etc. Nevertheless, the development of the stereo-image displaying technology still faces various obstacles. One of the obstacles comes from the limitation of the displaying device technology itself. So far, the bottleneck obstructing the stereo-image displays to be commercialized resides in the failure of the displaying quality to meet the user's demand such as the viewing angle and the number of observers. The cross-talk between stereo images is one of the touchiest issues in the industry. In terms of the image displaying quality, the stereo image technology has not been greatly improved; particularly, the solution to the problem of the cross-talk between stereo images has not been solved effectively. The cross-talk between stereo images disturbs the human brain from getting depth perception seriously.

The cross-talk between stereo images has been an important issue to be resolved in the study of the stereo image displaying apparatus. In a time multiplexed displaying apparatus, the stereo-images are usually displayed in page-flipping method. The major cross-talk problem comes from the slow responding time of the display media (e.g., the liquid crystal) of the stereo image displaying apparatus. Currently, the main stream of flat panel displaying apparatus is LCD apparatus which is non-self-illuminating displaying apparatus with respondent property different from the past CRT typed self-illuminating displaying apparatus. Particularly, the responding speed of the stereo-image needs about twice the responding speed of a traditional 2D display. Due to the need for fast responding speed in the stereo-image displaying technology, the cross-talk between images of the left eye and the right eye becomes a serious issue.

According to the visual characteristic of human eyes, a depth perception will be produced when the left and the right eyes respectively see a pair of images with the same scene but different parallax. When the operation speed of the image display is not fast enough, such as the image formed in the left eye remaining in the right eye upon changing views and vice versa, the so called cross-talk occurs. In other words, when the left eye sees images formed in the left eyes, another residual image is overlapped at the same time. This residual image comes from the previous image of the right eye. FIG. 1 shows a schematic view that illustrates the traditional cross-talk phenomenon. In FIG. 1, in an ideal condition (the left figure), Image signal 100 is for the image of the left eye and Image signal 102 is for the image of the right eye. Under this condition, the display device only displays images formed in the left eye. If the cross-talk of the residual image phenomenon (the right figure) happens, the display device displays the remaining image 104 of the left eye and the image content 106 of the right eye.

Traditionally, the image processing method is used to solve the aforesaid cross-talking problem. In other words, FIG. 2 shows that a schematic view that illustrates a traditional mechanism in which the image processing is used to improve the cross-talk problem. By way of the image process method, the left eye's image is used as a complementary image 108 which is displayed together with the image 110 of the left eye. In this way, due to the remaining image, the complementary image 108 which has been processed ahead eliminates the cross-talk between images so that no image remains in the left eye.

However, the disadvantage of the above-described technology is that the contrast of the image in a single eye is reduced. Thus, other methods to solve the cross-talk between images are still under development.

SUMMARY OF THE INVENTION

The present invention provides a stereo-image displaying apparatus which at least can solve stereo-image cross-talk problem of time-multiplexed manner or mixed time/spatial multiplexed manner. For example, for driving mechanism of non-self illuminant image displaying apparatus, the present invention goes along light source synchronously control and reduces image responding time to further reduce the image cross-talk so as to increase the quality of stereo image.

The present invention provides a method of reducing cross-talk between stereo images. For example, it, going along light source control of non-self illuminant image display apparatus's driving mechanism, reduces image responding time to lower the stereo-image cross-talk problem; further increasing the quality of the stereo image.

The present invention provides a stereo-image displaying apparatus which includes a light-source module which at least has a light emitting block. A light-source driving unit is coupled with the light-source module and the image displaying device, wherein the light emitting block is driven by the light-source driving unit to periodically emit a light according to a duty cycle. A stereo-image displaying panel produces an image data with an image display frequency and a stereo image is displayed by the light-source synchronously emitted by the light-source module.

The present invention provides another method of reducing the stereo-image cross-talk, which is suitable for controlling a light resource module of a stereo image displaying apparatus. The method includes, according to the length of an image displaying period, setting a light emitting duty cycle which is smaller than the image displaying period and utilizing a light-source driving unit to control the light-source module so that an image displaying frequency is synchronized to emit light according to the emitting duty cycle.

The present invention utilizes the light emitting duty cycle of controlling light source to properly reduce image responding effective time; thus, the problem of the stereo-image cross-talk is reduced and solved. The reduction of the light emitting duty cycle will influence the brightness of the overall image; however it can be set at a proper range. Furthermore, the image brightness can be enhanced by way of other regular adjusting method and still maintain the same total power consumption. Thus, the present invention does not influence the displaying quality in terms of the image brightness.

In order to the make aforementioned and other objects, features and advantages of the present invention comprehensible, a preferred embodiment accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
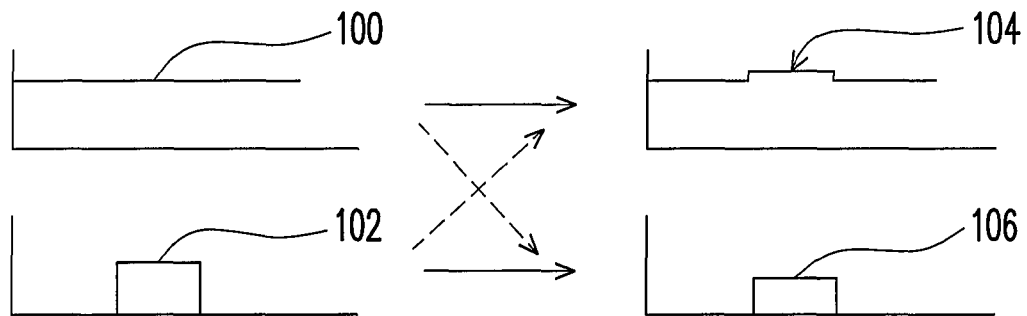
FIG. 1 shows a schematic view that illustrates a traditional image cross-talk phenomenon.
Figure 2:
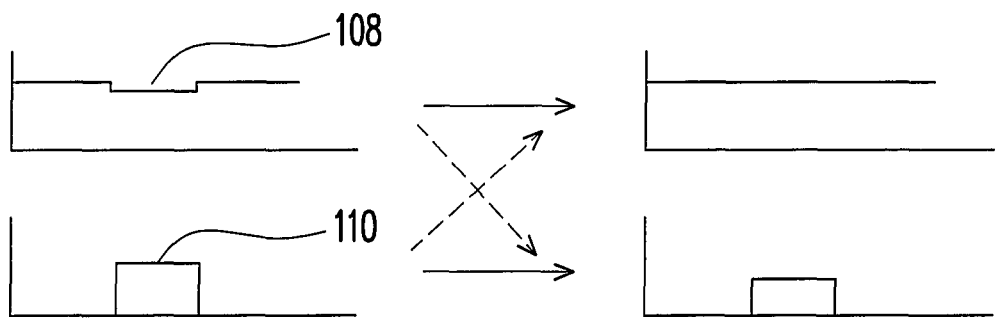
FIG. 2 shows that a schematic view that illustrates a traditional mechanism in which image processing is used to improve the cross-talk problem.

Reference will now be made in detail to the present preferred embodiments of the invention, examples of which are illustrated in the accompanying drawings. Wherever possible, the same reference numbers are used in the drawings and the description to refer to the same or like parts.

The present invention utilizes the direct control on the duty cycle of the light-source module for the light emitting intensity, so as to reduce the image cross-talk. In other words, the light-source module does not emit light continuously but emits light periodically according to the set duty cycle. The following will describe some embodiments as examples of the present invention; however the present invention is not limited by the embodiments.

Figure 3:
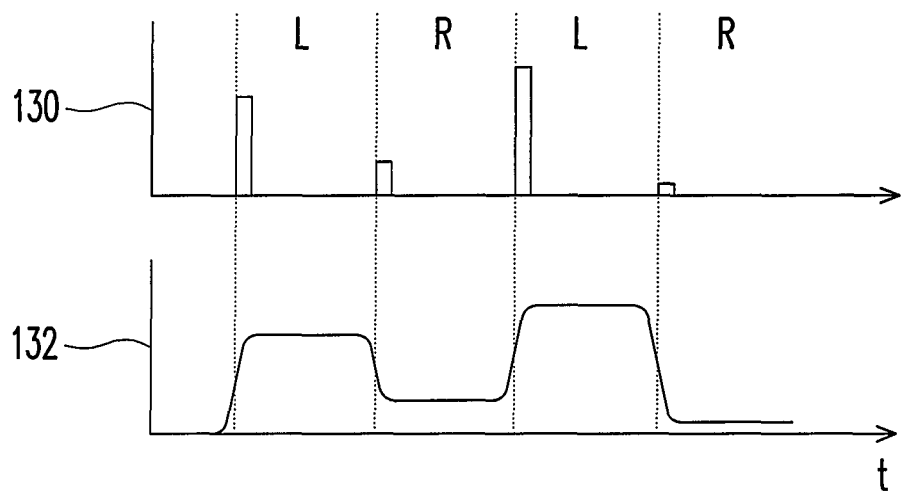
FIG. 3 shows a schematic view that illustrates the cross-talk problem caused by the traditional technology.
Figure 5:
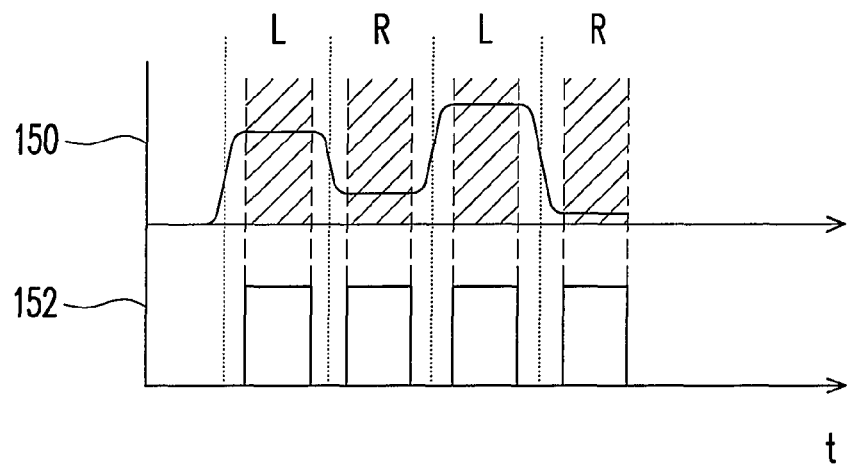
FIG. 5 shows a schematic view that illustrates the cross-talk of stereo images is reduced according to the embodiment of the present invention.

First, the traditional image cross-talk problem is reviewed. FIG. 3 shows a schematic view that illustrates the cross-talk problem caused by the traditional technology. For example, the gray level for one pixel at the specific region with abrupt change in contrast, such as at the edge of a white object at a dark background, is considered. In FIG. 3, signal 130 is the gray level voltage signal applied to the liquid crystal panel and the signal 132 is the response signal of the liquid crystal. It should be noted that the same pixel is used for alternatively displaying the left-eye image and the right-eye image in time sequence. Since the left-eye image is different from the right-eye image by a small displacement for producing the stereo-image effect. For example, the left eye may see the bright edge of the white object with high gray level while the right eye may see the dark background with the gray level as low as closing to zero. Signal 130 on the time axis is corresponding to the gray scale voltage signal of the left eye and the right eye in alternative display. In the signal 132, for one display period for left eye (L) or right eye (R), it includes the horizontal region corresponding to the actual gray level, and both the rising region and falling region. If the display frequency is still low at 60 Hz, the effect from the rising region and falling region can be ignored. However, under a high display frequency, such as 100 or 120 Hz or even higher frequency, since the response time of the liquid crystal (or other display media) remain the same, then the rising region and the falling region in comparing the horizontal region become relative large and cannot be ignored, as shown in FIG. 5. The residual effect from the previous image, so-called cross-talk, becomes worse. This phenomenon would, for example, particularly occur at the sharp bright edge.

Figure 4:
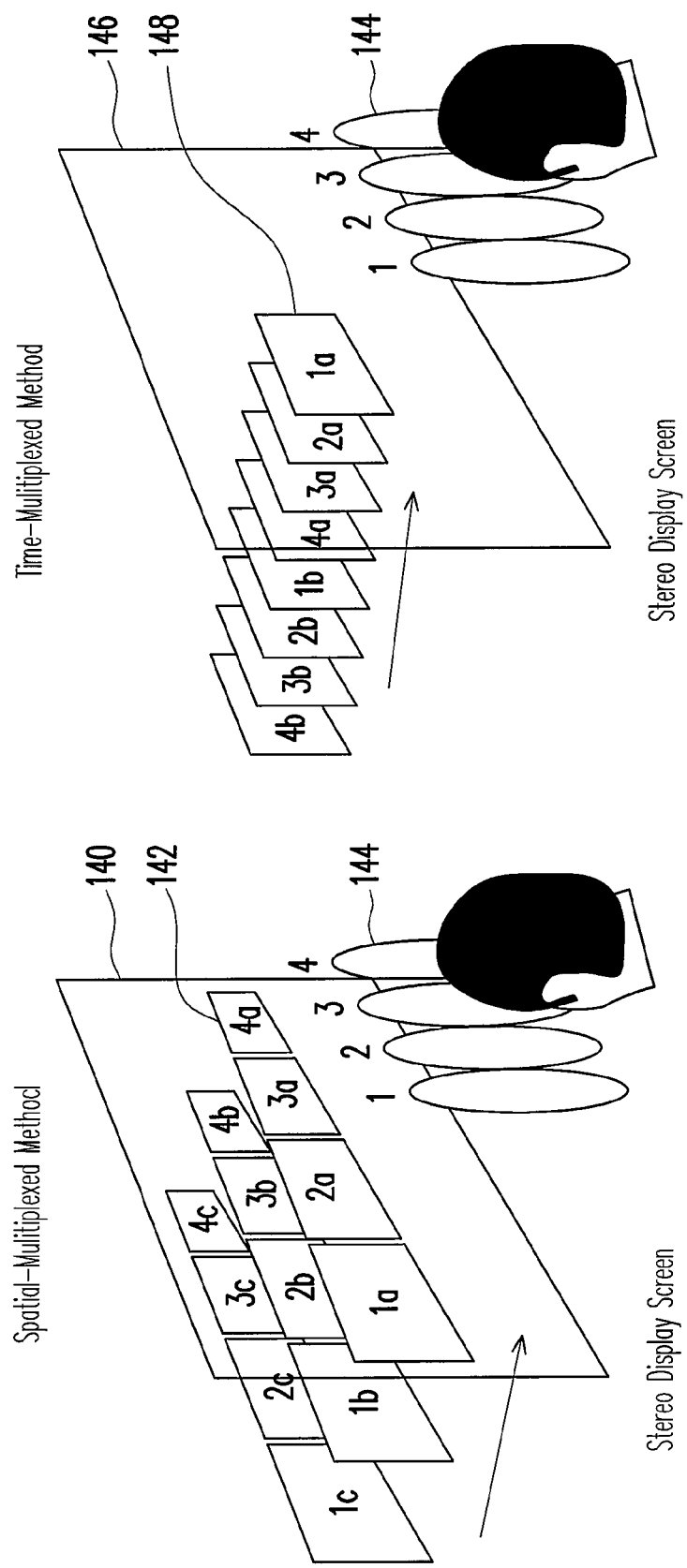
FIG. 4 shows a schematic view that illustrates the traditional stereo-image displaying mechanism.

Upon the study of the present invention concerning the image cross-talk, the cross-talk mechanism as shown in FIG. 3 is observed. After the study, the present invention provides a method of directly controlling the light-source module to solve the cross-talk problem. The stereo image displaying mechanism is described before the present invention's solution is mentioned FIG. 4 shows a schematic view that illustrates the traditional stereo-image displaying mechanism. Please refer to FIG. 4. The regular stereo-image displaying technology can be divided into spatial multiplexed displaying method (the left Fig.) and time multiplexed displaying method (the right Fig.) The spatial multiplexed displaying method displays the viewing zone images 142 of different parallax on a stereo displaying device 140 according to position so that a plurality of viewing zones 144 are formed in front of the human vision. A stereo-image is formed when visions of both eyes are in different viewing zones.

The time-multiplexed displaying method displays in sequence images of different viewing zone 148 on stereo image display 146. Due to visual persistence, the left eye and the right eye can see images of different viewing zones so that a stereo image is formed. However, to keep the stereo image within the visual persistence range, the speed of page-flipping of the images need to be fast. If the displaying device's responding speed is not fast enough, the cross-talk between images occurs. The present invention can reduce at least the cross-talk between images in the time multiplexed displaying method or time/spatial multiplexing displaying method. The methods provided by the present invention are not limited to the preferable embodiments. There are other suitable applications. The present invention utilizes the direct control on the duty cycle of the light-source module for the light emitting intensity, so as to reduce the image cross-talk. In other words, the light-source module does not emit light continuously but emits light periodically according to the set duty cycle.

FIG. 5 shows a schematic view that illustrates the cross-talk of stereo images is reduced according to an embodiment of the present invention. Please refer to FIG. 5. Signal 150 and signal 132 are similar but the display frequency is raised up to 100 or 120 Hz or even higher frequency, representing the pixel gray scale of the display of the left eye and the right eye images alternation on a time axis. The left-eye image ideally is the gray scale without any image content as discussed in FIG. 3. As previously stated, since the responding time of rising region and falling region for the liquid crystal (or other display media) still remains, the cross-talk becomes more serous without being ignored in the display period for left eye (L) and right eye (R). However, the present invention utilizes the illumination duty cycle (shaded region) that controls a light source, and maintains the same frequency with image displaying such that the residual image effect is reduced. Signal 152 is a light-source driving signal on the time axis. Preferably, the duty cycle in shaded region does not overlap with the rising region or the falling region. In other words, in terms of a complete displaying period for the right eye or for the left eye, the corresponding light source only activates one part of its ratio without involving the rising region or the falling region. That is the adjustment of the duty cycle. In FIG. 5, the time interval of the high level of signal 152 represents the interval of the light source activation, which is a part of a complete display period activation. For example, it is 90% or less than 90%. In this way, the effective interval of the residual image is shorted and the visual persistence phenomenon is relatively controlled. However, to maintain luminance of the display, a minimum of duty cycle can be predetermined according to the actual need of the duty cycle.

Figure 6:
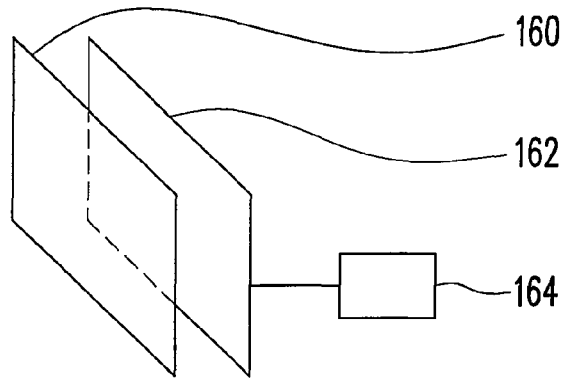
FIG. 6 shows a schematic view that illustrates the stereo image displaying apparatus according to the present invention's embodiment.

FIG. 6 shows a schematic view that illustrates a stereo image displaying apparatus according to the present invention's embodiment. Please refer to FIG. 6. The stereo image displaying apparatus comprises a stereo image displaying panel 160, a light-source module 162 and a light-source driving unit. The light-source module 162 is a back light module, for example. A light-source driving unit 164 is coupled with the light-source module 162. The light-source module 162 is driven by the light-source driving unit and emits a light source periodically according to the length of a duty cycle as shown in FIG. 5. An image data is formed by an image displaying frequency on the stereo image displaying panel 160. The stereo image displaying panel 160 displays a stereo image by way of the light source emitted synchronously by the light-source module 162. Because the duty cycle of illumination is not 100%, only within a part of time in the interval between one image data switching to another image data, the light source is activated according to the length of the duty cycle. For this, the regular time multiplexed displaying method or the time/spatial multiplexing displaying method can be applied to the technology of the stereo image displaying panel 160. The present invention concerns more on the light source displaying driving method. Persons skilled in the art can understand the technology concerning the stereo image displaying panel 160 and the light-source module 162. The stereo image displaying panel is LCD, LCOS displaying device or the holographic image displaying device.

Additionally, the embodiment provided in the present invention is aimed at the stereo image displaying panel 160 which is a design of non-self-illumination. Slow image responding speed causes the cross-talk between serial left and right images. However, even though the stereo image displaying panel 160 is a self-illuminating type, if the image responding speed is not fast enough, the present invention can be applied to the adjustment of the duty cycle of the light source. In other words, the source module 160 is not limited to the back light module in the embodiment.

Figure 7:
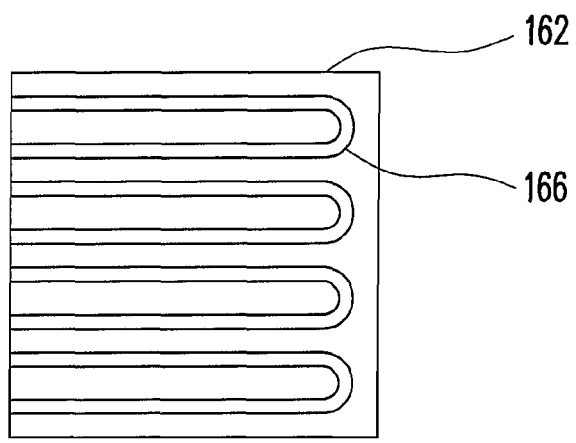
FIG. 7 shows a schematic view that illustrates the structure of the light-source module 162 used in the stereo image displaying apparatus according to one embodiment of the present invention.
Figure 8:
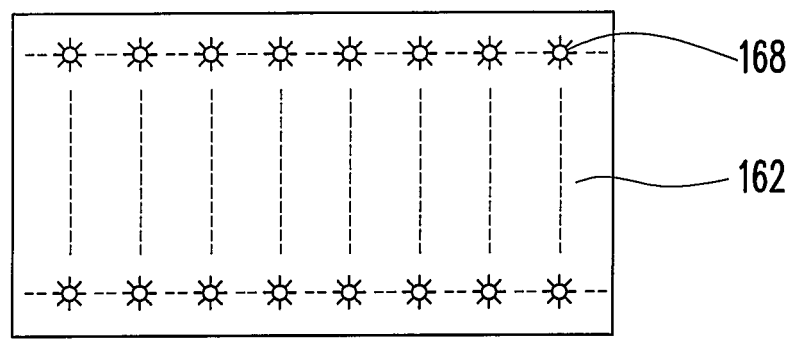
FIG. 8 shows a schematic view that illustrates the structure of the light-source module 162 used in the stereo image displaying apparatus according to another embodiment of the present invention.

FIG. 7 shows a schematic view that illustrates the structure of the light-source module 162 used in the stereo image displaying apparatus according to the embodiment of the present invention. In FIG. 7, the light-source module 162 comprises a plurality of Cold Cathode Fluorescent Lamp (CCFL) 166. Furthermore, according to actual design the CCFL can be driven overall. Or, the CCFL can be divided into several blocks being driven. In FIG. 8, if the light source comprises array having a plurality of the light emitting diodes 168, which can be controlled by all of the light emitting diodes or by divisions of a plurality of blocks.

Also, the light-source module 162 can comprise Field Emitting Display device (FED). And the structure of the stereo image displaying panel 160 can have various designs. The following embodiments are just used for examples but shall not be used to limit the present invention.

Figure 9:
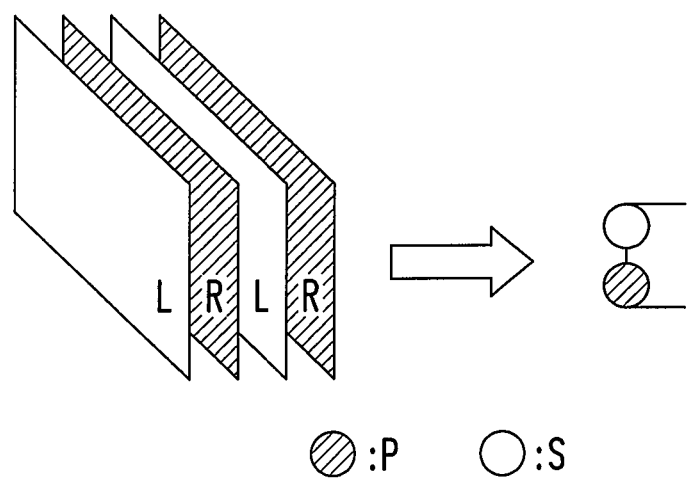
FIG. 9 shows a schematic view that illustrates the mechanism of the stereo image displaying panel of the stereo image displaying apparatus according to the embodiment of the present invention.
Figure 10:
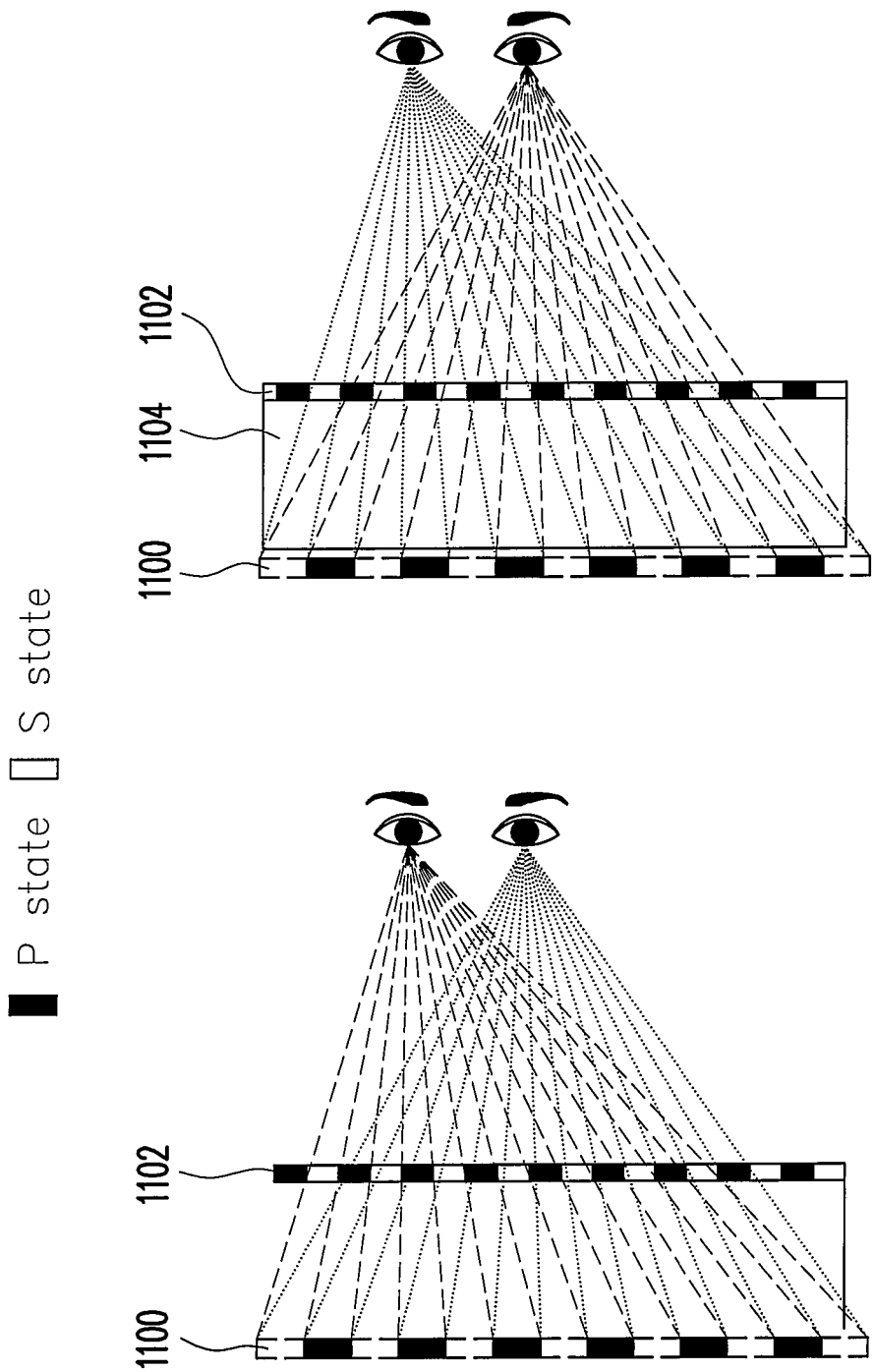
FIG. 10 shows a schematic view that illustrates the mechanism of the stereo image displaying panel of the stereo image displaying apparatus according to another embodiment of the present invention.

FIG. 9 shows a schematic view that illustrates the mechanism of the stereo image displaying panel of the stereo image displaying apparatus according to the embodiment of the present invention. In FIG. 9, this embodiment utilizes a pair of glasses having polarization, such as P polarization and S polarization, to view polarized images respectively. FIG. 10 shows a schematic view that illustrates the mechanism of the stereo image displaying panel of the stereo image displaying apparatus according to another embodiment of the present invention. In FIG. 10, the time/spatial multiplexing displaying mechanism in combination of time and spatial properties is used in this embodiment. The adjacent pixel column of the image pixel array belongs to images in different viewing zones. For example, each of the images alternating between the left eye viewing zone and the right eye viewing zone has different polarization. In the left figure of FIG. 10, the black block represents the pixel column of P polarization and the white block represents the pixel column in S polarization on display screen 1100, for example. In addition, an image obstruction board 1102 is installed over the display screen and at one side facing the viewer. Obstruction strip zones of P polarization and S polarization are implemented on the pixel column corresponding to the image obstruction board 1120. When an image having P polarization is displayed, the image enters one eye but the image having S polarization does not enter the other eye due to the obstruction of the image obstruction board 1102; and vice versa. If a delay plate 1104 (right Fig.) is added, the left eye can see the image in S polarization.

The structure of the above stereo image displaying panel 160 described in the above embodiment is only used to explain the simple mechanism of the stereo image. The present invention can be used in different stereo image displaying apparatus design, wherein the present invention is related to the design of the light source control of displaying apparatus. Designs for other parts can be various. They are not limited to the embodiments of the present invention.

In conclusion, the present invention utilizes the control of light source to reduce any possible cross-talk brought by the low image refresh rate of the display media to enhance the stereo image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A stereo-image displaying apparatus, comprising:
  a light-source module including at least one light-emitting block;
  a light-source driving unit, coupled with the light-source module, wherein the light emitting block is driven by the light-source driving unit to periodically emit a light according to a duty cycle; and a stereo-image displaying panel, changing an image at an image displaying frequency, wherein a stereo image composed from a left-eye image and right-eye image is lit and presented to the viewers' eyes by the light-source module which is synchronously controlled to emit light by the light-source driving unit.

2. The stereo-image displaying apparatus of claim 1, wherein the duty cycle has a predetermined minimum corresponding to the human eye capability.

3. The stereo-image displaying apparatus of claim 1, wherein the stereo image is displayed according to a time-multiplexed displaying mechanism.

4. The stereo-image displaying apparatus of claim 1, wherein the stereo image is displayed according to a time/spatial multiplexed displaying mechanism.

5. The stereo-image displaying apparatus of claim 1, wherein the light-source module is a backlight module.

6. The stereo-image displaying apparatus of claim 1, wherein the light-source module is formed from an active luminescence device.

7. The stereo-image displaying apparatus of claim 6, wherein the active luminescent device includes LED, FED or CCFL.

8. The stereo-image displaying apparatus of claim 1, wherein the stereo-image displaying panel is a non-self-illuminating spatial light modulator.

9. The stereo-image displaying apparatus of claim 8, wherein the spatial light modulator comprises a liquid displaying device, a liquid crystal on silicon display device or a holographic image displaying device.

10. The stereo-image displaying apparatus of claim 1, wherein the light emitted by the light-source module turns off before the stereo-image displaying panel changes the image in each time.

11. A method of reducing stereo-image cross-talk, which is suitable for controlling a light-source module of a stereo-image displaying apparatus, comprising:

according to an image displaying period, setting an illuminating duty cycle, and the illuminating duty cycle is less than the image displaying period; and utilizing a light-source driving unit for controlling the light-source module so as to illuminate according to the illuminating duty cycle, synchronizing to an image displaying frequency.

12. The method of reducing the stereo-image cross-talk of claim 11, wherein the light-source module is a backlight module.

13. The method of reducing the stereo-image cross-talk of claim 11, wherein the light-source module comprises at least a light emitting block driven by the light-source driving unit.

14. The method of reducing the stereo-image cross-talk of claim 11, wherein the stereo-image displaying apparatus utilizes a time multiplexed displaying mechanism to display the stereo-image.

15. The method of reducing the stereo-image cross-talk of claim 11, wherein the stereo-image displaying apparatus utilizes a time/spatial multiplexed displaying mechanism to display the stereo-image.

16. The method of reducing the stereo-image cross-talk of claim 11, wherein the light-source module is an active luminescence device.

17. The method of reducing the stereo-image cross-talk of claim 16, wherein the active luminescence device includes LED, FED or CCFL.

18. The method of reducing the stereo-image cross-talk of claim 11, wherein the stereo-image displaying apparatus is a non-self-illuminating optical device.

19. The method of reducing the stereo-image cross-talk of claim 18, wherein the non-self-illuminating optical device comprises a liquid displaying device, a liquid crystal on silicon display device or a holographic image displaying device.

20. The method of reducing stereo-image cross-talk of claim 11, wherein a light illuminated by the light-source module turns off before the stereo-image displaying apparatus changes a displaying image in each time.

* * * * *